US007014466B2

(12) United States Patent
Cojic et al.

(10) Patent No.: US 7,014,466 B2
(45) Date of Patent: Mar. 21, 2006

(54) PRIMER SELECTION FOR ARCHITECTURAL COATINGS

(75) Inventors: Nicholas M. Cojic, Parma, OH (US); Robert L. Bush, Akron, OH (US); Timothy P. Stanton, Rocky River, OH (US); Francis O'Donnell, Avon Lake, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 10/425,106

(22) Filed: Apr. 28, 2003

(65) Prior Publication Data

US 2004/0052936 A1 Mar. 18, 2004

Related U.S. Application Data

(63) Continuation of application No. 09/758,004, filed on Jan. 10, 2001, now abandoned.

(51) Int. Cl.
*G09B 19/00* (2006.01)

(52) U.S. Cl. .......................................... 434/105; 434/98

(58) Field of Classification Search .................. 434/81, 434/84, 98, 102, 105

See application file for complete search history.

(56) References Cited

U.S. PATENT DOCUMENTS

| | | | | |
|---|---|---|---|---|
| 935,474 | A * | 9/1909 | Eckart | 434/98 |
| 2,899,755 | A * | 8/1959 | Terilli | 434/98 |
| 3,088,226 | A * | 5/1963 | Watterson | 434/102 |
| 3,365,816 | A * | 1/1968 | Singerman | 434/102 |
| 4,457,718 | A * | 7/1984 | Lerner | 434/98 |
| 4,546,007 | A * | 10/1985 | Abe et al. | 427/8 |
| 4,552,780 | A | 11/1985 | Abe et al. | 427/8 |
| 4,665,394 | A * | 5/1987 | Coles et al. | 340/815.67 |
| 5,217,377 | A * | 6/1993 | Little, Jr. | 434/103 |
| 5,700,515 | A | 12/1997 | Rodrigues | 427/140 |
| 6,270,123 | B1 * | 8/2001 | Spangler | 283/114 |

* cited by examiner

*Primary Examiner*—Kurt Fernstrom
(74) *Attorney, Agent, or Firm*—Vivien Y. Tsang; Robert E. McDonald; Paul R. Katterle

(57) ABSTRACT

A method for selecting an architectural primer providing highest chromaticity and color development for a given topcoat color. A primer selection system comprising a plurality of selectable gray shade primers, having the capability to overlay a desired topcoat color to visualize color differences of the topcoat color over the various gray shade primers.

2 Claims, 3 Drawing Sheets

AN EXAMPLE OF A PANEL OF GRAY SHADE PRIMERS ACCORDING TO THIS INVENTION

AN EXAMPLE OF A PANEL OF GRAY SHADE PRIMERS ACCORDING TO THIS INVENTION

RED TOPCOAT

PRIMER SELECTION FOR ARCHITECTURAL COATINGS

CROSS-REFERENCE TO RELATED APPLICATION

This application is a continuation of U.S. patent application Ser. No. 09/758,004, filed on Jan. 10, 2001 now abandoned, the entirety of which is hereby incorporated by reference.

BACKGROUND OF THE INVENTION

A system and method for selecting a gray shade primer undercoat that would provide optimal color development of a poor hiding topcoat at less than half the film thickness of the topcoat color at complete hiding.

The method of this invention is directed to choosing a gray shade primer color such that a topcoat can be applied over the primer at less than complete hiding but still achieve optimal color development of a topcoat color. This invention provides a simple way for determining an appropriate gray shade primer color for any given top coat color.

Numerous difficulties have been encountered developing high chromaticity, or color development, in colors which, due to their nature, have poor hiding. The inventors have developed a simplified method of determining an optimum color of gray primer for a given top coat so that, even if a topcoat is applied at less than 100% hiding, no color difference can be detected visually as compared with the color of the topcoat applied at complete hiding.

Techniques have been used to select proper gray, white, or black primers in the area of auto body repair or repaint to assure that a top coat matches other parts of the vehicle that have not been repainted. For example, Abe et al, U.S. Pat. No. 4,546,007, uses a method of selecting a white, gray, or black primer whose spectral reflectance comes as close as possible to the maximum value of the spectral reflectance curve of the top coat when applied at complete hiding. The method of Abe et.al. teaches matching the color of paint that is being repaired. Also, in U.S. Pat. No. 5,700,515 to Rodrigues is disclosed a method for selecting a primer, wherein a gray primer of choice would be the one whose reflectance is the same or very close to the reflectance of the topcoat at the wavelength of minimum absorption of the top coating. However, architectural products have different application challenges than automotive applications, such as banding and roller overlap of topcoat colors, which create unevenness in the coating appearance.

To overcome the above challenges of architectural coatings, it has been found that gray shade primers, when used as an undercoat, can provide reproducible and consistent topcoat color hiding and color development. The use of this system provides optimized color gamut, film integrity and hiding, and dramatically improves touch-up which are primary concerns in the architectural coatings industry. Use of a gray shade primer helps prevent banding (also known as picture framing) and roller overlap (lap marks) in roller application. The use of a gray shade primer according to this invention also prevents a mottled or grainy film appearance, so the color maintains a uniform appearance with the elimination of micro-variations.

SUMMARY OF THE INVENTION

The present invention is a method for selecting a primer for a given architectural topcoat color, wherein a gray shade primer is selected by visually determining which gray shade produces the optimum chromaticity and hue in color development. The method for selecting a primer for a given topcoat color, comprises:

a) providing a plurality of selectable gray shade primers of incrementally increasing reflectance values from black to white, said gray shade primers have reflectance values in the range of about 0.5% to about 99.5%;
b) forming a distinct layer of each gray shade primer on at least one panel and allowing the primer layer to dry completely;
c) providing a single draw down layer of a desired topcoat over said gray shade primers and allowing the topcoat to dry completely;
d) visually selecting one of said plurality of gray shade primers that displays optimal color development of a topcoat color, and wherein the top coat has improved color development, and wherein banding, graininess, and mottling are reduced.

Accordingly, it is also an object of the invention to provide a primer selection system, wherein said system comprises a plurality of selectable gray shade primers, wherein each selectable gray shade increases incrementally in reflectance value from black to white; wherein said primer selection system is capable of having a desired topcoat color overlaid over said plurality of selectable gray shade primers to visualize color differences of the top coat color over the plurality of various gray shade primers.

DETAILED DESCRIPTION OF THE INVENTION

The method of this invention is directed to choosing a primer coat color such that the topcoat can be applied over the primer at less than complete hiding, but still achieve the color development appearance of the topcoat at 100% hiding. In addition to achieving the high color development with less coats of topcoat, the primer selected utilizing this method enhances the hue, chromaticity of the topcoat, reduces the tendency for banding, graniness, and mottling, and enhances color uniformity and touch-up, which are especially desirable for architectural coatings. The method requires use of primer coatings that are white and various shades of gray, including black, having incrementally increasing reflectance values. Reflectance, or reflected light, is a measure of the amount of light reflected by a surface at each wavelength. This invention is concerned with the visible spectrum of light; i.e., about 400–700 nm. Reflectance for the gray shade primer coatings used herein is measured over the 400–700 nm spectrum using a conventional spectrophotometer. Reflectance values of each primer can be determined at the tri-stimulus Y-value for each primer. The tri-stimulus Y-value can be determined utilizing measurements taken with a MacBeth spectrophotometer, and the $\Delta E$ can be determined using the FMC II color difference metric function of the spectrophotometer. The desired primer for any particular topcoat is preferably the primer having a minimum ΔE between the topcoat-primer combination and the topcoat color at complete hide. Preferably, the ΔE is less than 1.

Gray shade primers can be made by simply adding an appropriate amount of black colorant to a white base primer at varying proportions to achieve gray shade primer colors having varying reflectance values. Reflectance may be determined by conventional spectrophotometers, and are measured at the wavelength of 400–700 nm, the visible spectrum of light. Preferably, the gray shades are in about 5% to about 15% increments between each other to be able to make meaningful comparisons. The gray shade primers of this invention were made according to the following formulations:

| Primer | Formula per 1 gallon white base | Reflectance Value (%) |
|---|---|---|
| A | white, 0 oz. black colorant | 75–85 |
| B | ⅛ oz. black colorant | 65–75 |
| C | ½ oz black colorant | 55–65 |
| D | 1 oz black colorant | 45–55 |
| E | 4 oz black colorant | 25–35 |
| F* | 2.5 oz black colorant* | 10–20 |

(*white base with reduced TiO2 level)

Figure 1:
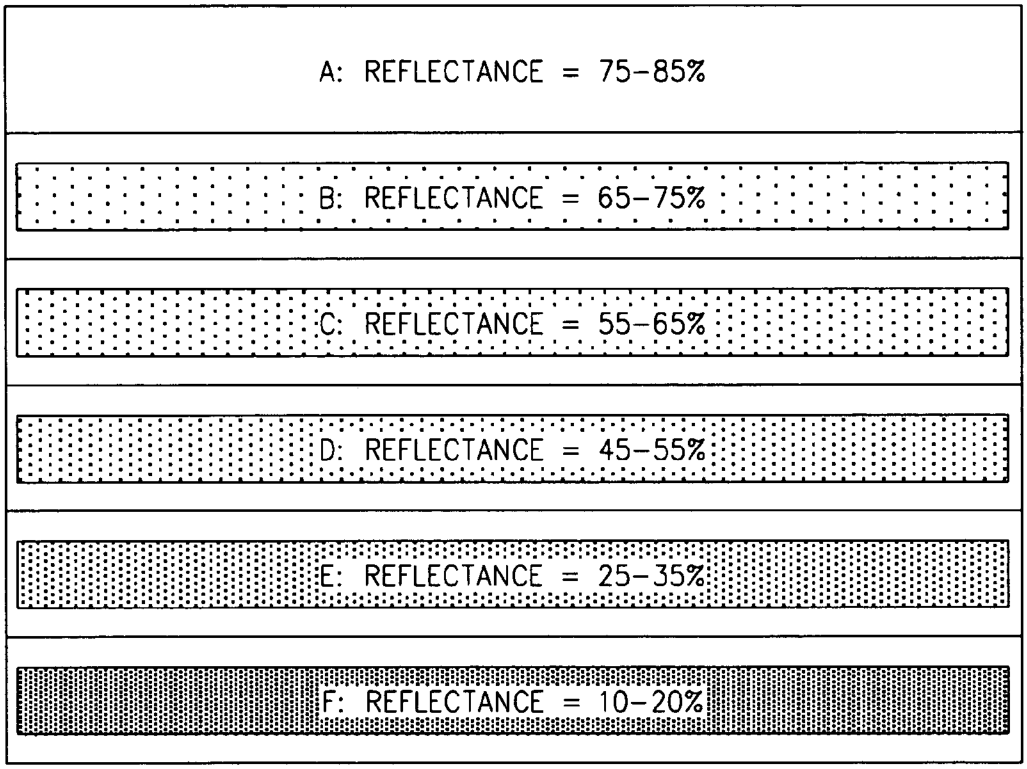
FIG. 1 illustrates a panel of gray shade color primers that can be utilized according to this invention.
Figure 2:
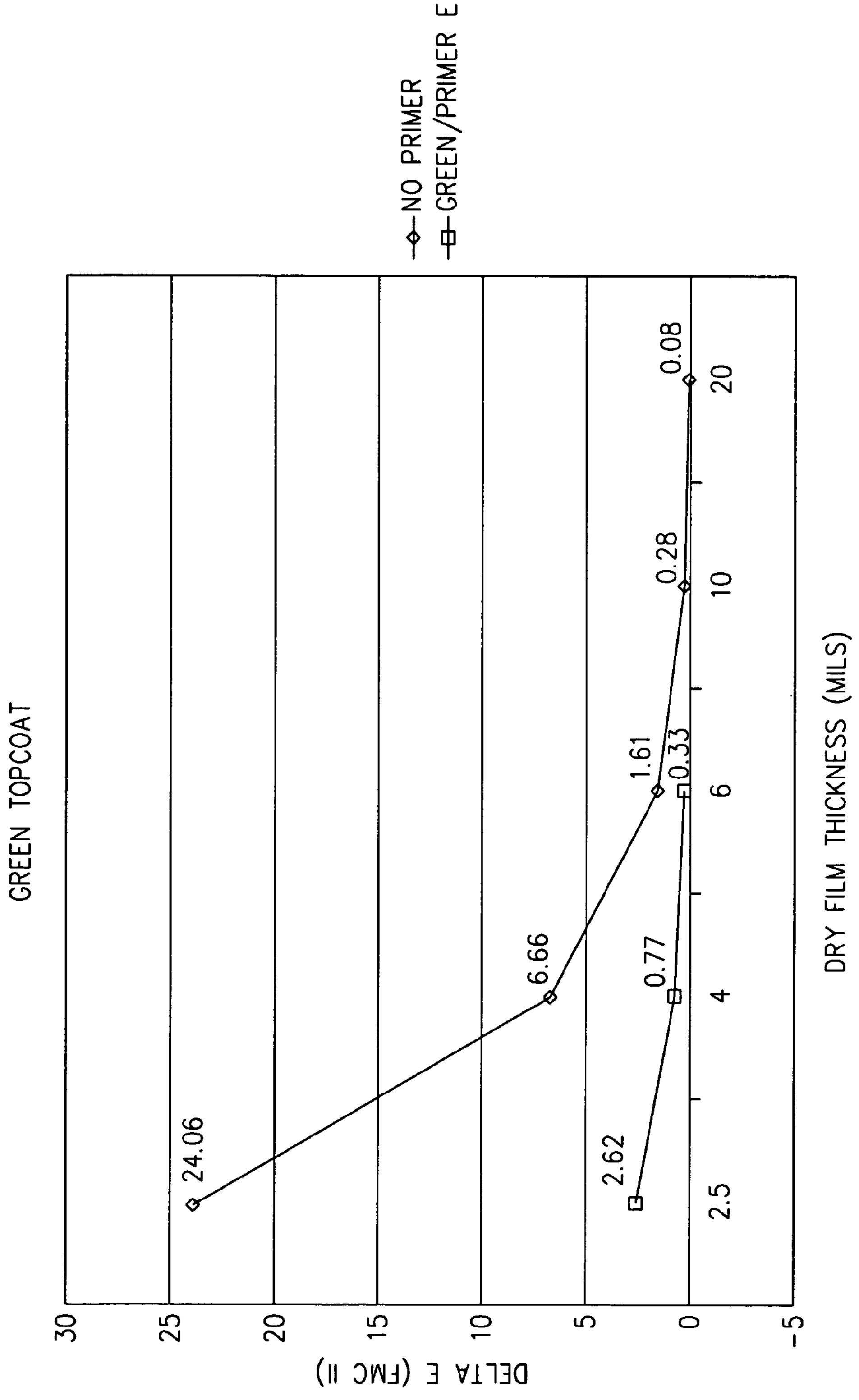
FIGS. 2 and 3 are curve patterns for the colors green and red respectively, showing color difference ($\Delta E$) as a function of film thickness, in a primeness system vs. a system utilizing the selected gray shade primer according to this invention.
Figure 3:
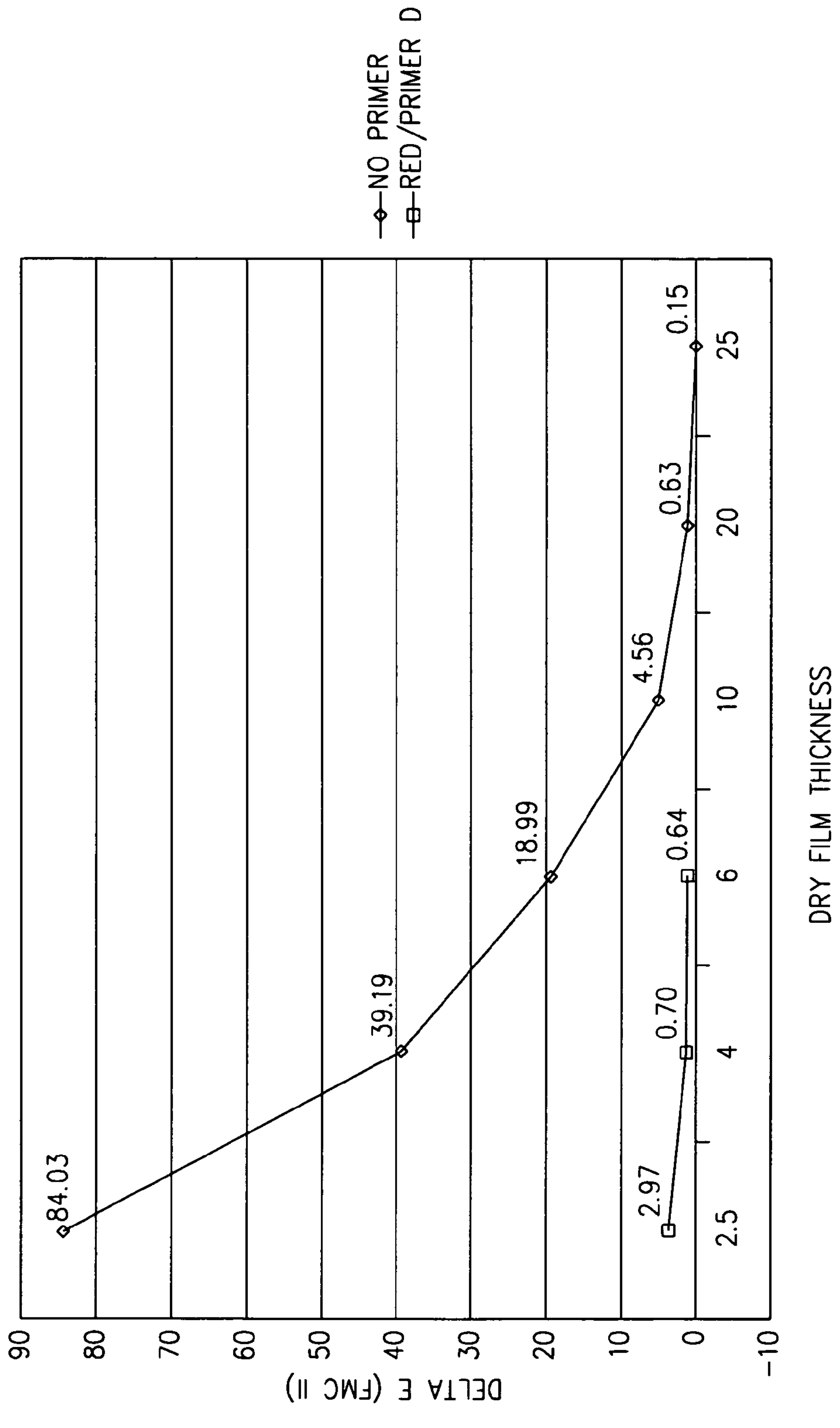

Each gray shade primer is drawn down on at least one panel or a plurality of panels, forming a distinct layer of each gray shade, and allowed to dry completely. An example of a panel with the above gray shade primers is shown in FIG. 1. A single layer of a desired topcoat can then be drawn down over the various dried gray shade primer coats, and allowed to dry. After the topcoat has dried, the panel(s) having the topcoat over the plurality of gray shade primers can be visually compared against each other to determine which primer coat achieves optimal color development as compared to the topcoat color at complete hide. Complete hiding of a topcoat color, according to this invention, is achieved when the color difference between the topcoat of complete hiding and the topcoat applied over a primer is less than 1; i.e., ΔE<1. The relationship between the dry film thickness of the topcoat and the color difference actually measured is shown in FIGS. 2 and 3 for the colors green and red, respectively. The dry film thickness of the respective topcoat to achieve the ΔE<1 color difference are shown in Tables 1 and 2.

Thus, the primer selection system of this invention comprises a plurality of selectable gray shade primers that have each been applied to at least one panel to form separate and distinct color shades, wherein each selectable gray shade increases incrementally in reflectance value from black to white. The primer selection system can also have the capability to overlay a desired top coat color over the plurality of selectable gray shade primers to visualize color differences of the top coat color over the various gray shade primers. The topcoat is typically provided as a single draw down layer over the gray shade primers, and allowed to dry. The method of overlaying the topcoat is not critical to this invention. However, most preferably, a single layer draw down of the topcoat is applied directly over the dried gray shade primer, wherein the gray shade primer is an undercoat in the system. Another method is to provide a single coat draw down layer of the topcoat on a clear transparent material for overlaying on the panel of gray color shades. The gray shade which produces the optimal color development can also be determined by visual inspection this way.

COMPARATIVE EXAMPLES

Example 1(a)

Green

A green paint with poor hiding was applied to a Leneta 3B chart until complete hiding of the topcoat was achieved. The dry film thickness required to achieve complete hiding (ΔE<1) was 10 mils. The ΔE was determined utilizing a MacBeth 2145 spectrophotometer.

Comparative Example 1(b)

Green

The green paint of Example 1(a) was applied to a panel having six gray shade primers of reflectance value ranges of 75–85% (A), 65–75% (B), 55–65% (C), 45–55% (D), 25–35% (E) and 10–20% (F), as measured utilizing a MacBeth spectrophotometer at the tristimulus Y-value. The dry film thickness required to achieve optimal color development was 4 mils.

The following table shows dry film thickness data of the topcoat for the primeness system vs. the gray shade primers of the varying reflectance values above:

TABLE 1

| GREEN | | | | | | | |
|---|---|---|---|---|---|---|---|
| Dry Film thickness | ΔE (FMC II) | | | | | | |
| (mils) | Primerless | A | B | C | D | E | F |
| 2.5 | 24.06 | 9.92 | 9.28 | 7.13 | 6.24 | 2.62 | 4.10 |
| 4 | 6.66 | 2.68 | 2.75 | 2.44 | 2.47 | 0.77 | 2.36 |
| 6 | 1.61 | 2.23 | 1.54 | 1.46 | 1.42 | 0.33 | 1.75 |
| 10 | 0.28 | | | | | | |
| 20 | 0.08 | | | | | | |

The data shows that the E primer displayed the most optimal results with ΔE=0.77 at dry film thickness of 4 mils, which is less than half the film thickness of complete hide and color development on the primerless substrate.

Example 2(a)

Red

A red paint with poor hiding was applied to a Leneta 3B chart until complete hiding of the topcoat was achieved. The dry film thickness required to achieve complete hiding (ΔE<1) was 20 mils.

Comparative Example 2(b)

Red

The red paint of Example 2(a) was applied to a panel having six gray shade primers of reflectance value ranges of 75–85% (A), 65–75% (B), 55–65% (C), 45–55% (D), 25–35% (E) and 10–20% (F). The dry film thickness required to achieve optimal color development was 4 mils.

The following table shows dry film thickness data of the topcoat for the primerless system vs. the gray shade primers of the varying reflectance values above:

TABLE 2

| | RED | | | | | | |
|---|---|---|---|---|---|---|---|
| Dry Film thickness | ΔE | | | | | | |
| (mils) | Primerless | A | B | C | D | E | F |
| 2.5 | 84.03 | 15.15 | 10.61 | 5.27 | 2.97 | 13.73 | 18.58 |
| 4 | 39.19 | 8.68 | 6.14 | 2.46 | 0.79 | 7.54 | 11.11 |
| 6 | 18.99 | 3.81 | 2.69 | 1.40 | 0.64 | 4.43 | 7.93 |
| 10 | 4.56 | | | | | | |
| 20 | 0.63 | | | | | | |

The data shows that the D primer displayed the most optimal results with ΔE=0.79 at a dry film thickness of 6 mils, which is less than half the dry film thickness of the coating at which complete hiding and color development occurs when applied over a primeness substrate.

The invention claimed is:

1. A method for selecting an architectural primer providing highest chromaticity for a given topcoat color, comprising:

a) providing a plurality of selectable architectural gray shade primers of incrementally increasing reflectance values from dark gray to white, said gray shade primers have reflectance values in the range of 0.5% to 99.5%;

b) forming a distinct layer of each gray shade primer on at least one panel and allowing the primer layer to dry completely;

c) applying a single draw down layer of a desired architectural topcoat over said gray shade primers and allowing the topcoat to dry completely;

d) comparing the dried top coat color with a complete hiding top coat;

e) visually selecting one of said plurality of gray shade primers that displays optimal color development of the topcoat color; and f) achieving a color difference of less than 1 at less than ½ the dry film thickness of the color at complete hiding as compared to the color of the complete hiding top coat; and g) achieving a top coat layer displaying reduced banding, graininess, mottling or roller overlap.

2. The method of claim 1, wherein achieving a top coat layer displaying reduced banding, graininess, mottling or roller overlap further comprises applying an additional draw down layer of the architectural top coat.

* * * * *

UNITED STATES PATENT AND TRADEMARK OFFICE

CERTIFICATE OF CORRECTION

PATENT NO. : 7,014,466 B2
APPLICATION NO. : 10/425106
DATED : March 21, 2006
INVENTOR(S) : Nicholas M. Cojic et al.

It is certified that error appears in the above-identified patent and that said Letters Patent is hereby corrected as shown below:

In the Specification

Column 2, Line 36, delete “primeness” and insert --primerless--.

Column 5, Line 19, delete “primeness” and insert --primerless--.

Signed and Sealed this
Twenty-sixth Day of May, 2015

Michelle K. Lee
*Director of the United States Patent and Trademark Office*